US012590250B2

(12) United States Patent
Lawrence et al.

(10) Patent No.: US 12,590,250 B2
(45) Date of Patent: Mar. 31, 2026

(54) SYSTEM AND METHOD FOR SEPARATING BITUMEN FROM SHINGLE POWDER

(71) Applicant: CRS-SPV INC., Louisville, KY (US)

(72) Inventors: William Lovell Lawrence, Louisville, KY (US); Edward Merrel Brownlee, Louisville, KY (US); Alexander Bennett Hoekstra, Louisville, KY (US); Michael Thomas Earl, Jeffersonville, IN (US); Jonathon Daniel Horton, Barrington, RI (US)

(73) Assignee: Redivius, Inc., Jeffersonville, IN (US)

( * ) Notice: Subject to any disclaimer, the term of this patent is extended or adjusted under 35 U.S.C. 154(b) by 299 days.

(21) Appl. No.: 18/192,320

(22) Filed: Mar. 29, 2023

(65) Prior Publication Data

US 2023/0313045 A1      Oct. 5, 2023

Related U.S. Application Data

(60) Provisional application No. 63/324,872, filed on Mar. 29, 2022.

(51) Int. Cl.
 *C10C 3/08*       (2006.01)
 *B01D 3/00*       (2006.01)
 *B01D 11/02*      (2006.01)

(52) U.S. Cl.
 CPC ................. *C10C 3/08* (2013.01); *B01D 3/00* (2013.01); *B01D 11/028* (2013.01); *B01D 11/0288* (2013.01)

(58) Field of Classification Search
 CPC .. C10C 3/08; C10C 3/007; C10C 3/06; B01D 11/0207; B01D 11/0257; B01D 11/0284;
 (Continued)

(56) References Cited

U.S. PATENT DOCUMENTS 8,919,681 B1    12/2014  Horton et al.
9,156,035 B1    10/2015  Horton et al.
(Continued)

FOREIGN PATENT DOCUMENTS

CA        3177840 A1      1/2023
CN        112708435 A     4/2021

OTHER PUBLICATIONS

Korean Intellectual Property Office, International Search Report and Written Opinion issued in corresponding Application No. PCT/US2023/065101, mailed Jul. 17, 2023.
(Continued)

*Primary Examiner* — Joseph W Drodge
(74) *Attorney, Agent, or Firm* — Stites & Harbison, PLLC; David W. Nagle, Jr.; Gary N. Stewart

(57)                  ABSTRACT

A system for separating bitumen from shingle powder includes: a blender; a solvent tank in fluid communication with the blender; a water tank in fluid communication with the blender; a decanting tank in fluid communication with the blender; a distillation tank in fluid communication with the decanting tank; and a plurality of pumps for pumping fluids between various components of the system or out of the system. When the system is in use, the blender receives and mixes solvent from the solvent tank with shingle powder containing bitumen to produce a bitumen-infused solvent. Water is supplied to the blender from the water tank to wash an interior of the blender. Bitumen-infused solvent received in the decanting tank from the blender is separated from excess water. Bitumen within the bitumen-infused solvent is isolated within the distillation tank.

24 Claims, 4 Drawing Sheets

(58) Field of Classification Search

CPC ........... B01D 11/0288; B01D 11/0296; B01D 5/0057; B01D 5/006; B01D 5/0075; B01D 3/00; B01D 11/02; B01D 11/215; B01D 11/0253; B01D 11/028; B01D 21/00; B01D 11/0215; C10G 1/045; B03B 9/02; B03B 9/065

See application file for complete search history.

(56) References Cited

U.S. PATENT DOCUMENTS

| | | | |
|---|---|---|---|
| 9,440,239 B1 | 9/2016 | Horton et al. | |
| 11,492,455 B1* | 11/2022 | Charles | C08J 11/08 |
| 11,591,524 B2 | 2/2023 | Horton | |
| 2002/0144717 A1* | 10/2002 | Tunnicliffe | C10G 1/04 |
| | | | 134/36 |
| 2008/0210602 A1 | 9/2008 | Duyvesteyn | |
| 2011/0165376 A1* | 7/2011 | Whitaker | C08L 95/00 |
| | | | 106/668 |
| 2012/0305451 A1 | 12/2012 | Adeyinka et al. | |
| 2014/0271928 A1* | 9/2014 | Rehage | A61K 8/34 |
| | | | 424/680 |

| | | | |
|---|---|---|---|
| 2015/0158789 A1 | 6/2015 | Keusenkothen et al. | |
| 2018/0334620 A1* | 11/2018 | Kotefski | B09B 3/80 |
| 2019/0255534 A1 | 8/2019 | Shelton, Jr. et al. | |
| 2020/0023287 A1* | 1/2020 | Danelich | C11B 1/10 |
| 2020/0071621 A1 | 3/2020 | Nicosia et al. | |
| 2020/0224032 A1* | 7/2020 | Kotefski | C08L 91/00 |
| 2020/0325071 A1* | 10/2020 | Franzen | E04D 1/20 |
| 2021/0207034 A1* | 7/2021 | Podlipskiy | B01D 11/0284 |
| 2022/0002610 A1 | 1/2022 | Melbouci et al. | |
| 2023/0174869 A1 | 6/2023 | Horton | |
| 2023/0272181 A1 | 8/2023 | Charles et al. | |
| 2023/0313045 A1 | 10/2023 | Lawrence et al. | |

OTHER PUBLICATIONS

Canadian Intellectual Property Office, Examination Report issued in corresponding Application No. 3,251,089 dated Dec. 11, 2025.

United States Patent and Trademark Office, International Search Report and Written Opinion issued in Application No. PCT/US2025/031221, mailed Aug. 1, 2025.

Willis, "Reclaimed Asphalt Shingles Characterization: Best Practices," May 2023, NCAT Report 13-07, https://www.eng.auburn.edu/research/centers/ neat/files/technical-reports/rep 13-07. pdf.

* cited by examiner

SYSTEM AND METHOD FOR SEPARATING BITUMEN FROM SHINGLE POWDER

CROSS-REFERENCE TO RELATED APPLICATION

The present application claims priority to U.S. Patent Application Ser. No. 63/324,872 filed on Mar. 29, 2022, the entire disclosure of which is incorporated herein by reference.

BACKGROUND OF THE INVENTION

The present invention relates to a system and method for separating bitumen (also known as asphalt) from powder derived from shingles.

Shingles are roofing materials which are used to cover and protect the rooftops of residential homes from moisture ingress and other environmental elements. Typically, shingles are flat, rectangular elements which are laid in an overlapping arrangement starting from the edge of the rooftop and ending at the pitch of the rooftop. Bitumen shingles are generally comprised of bitumen and other constituents (e.g., sand and limestone) and are commonly selected for roofing projects due to their longevity and cost-effectiveness. Over time, however, these shingles must be replaced with new shingles due to wear, typically requiring the used shingles to be torn off of the rooftop to which they were applied. The constituents of used bitumen shingles and, in particular, bitumen, are valuable if isolated and repurposed or reused. However, because the constituents of such shingles are not readily separable, they are often discarded as waste.

SUMMARY OF THE INVENTION

The present invention is a system and method for separating bitumen from shingle powder.

An exemplary system for separating bitumen from shingle powder made in accordance with the present invention includes: a blender; a solvent tank in fluid communication with the blender; a water tank in fluid communication with the blender; a decanting tank in fluid communication with the blender; a distillation tank in fluid communication with the decanting tank; and a plurality of pumps for directing materials throughout, or out of, the system.

The blender is configured to receive and mix solvent supplied by the solvent tank with shingle powder containing bitumen to produce a bitumen-infused solvent.

The water tank is configured to supply water to wash an interior of the blender in which the shingle powder and solvent is mixed.

The decanting tank is configured to receive the bitumen-infused solvent from the blender and can be utilized as a temporary holding vessel in which the bitumen-infused solvent can sit for a predetermined period to permit separation of the bitumen-infused solvent and any water transferred along with the bitumen-infused solvent from the blender.

The distillation tank is configured to isolate bitumen from bitumen-infused solvent received from the decanting tank.

In some embodiments, the distillation tank is configured to vaporize the solvent of bitumen-infused solvent to isolate bitumen and to liquefy the isolated bitumen. In one such embodiment, the distillation tank includes a vacuum distillation vessel in which the solvent of the bitumen-infused solvent is evaporated and the isolated bitumen is liquefied.

In some embodiments, the system further includes a collection tank in fluid communication with the distillation tank and into which isolated bitumen from the distillation tank is received. In some embodiments, the collection tank includes a heater for maintaining isolated bitumen received from the distillation tank in a liquefied state.

In some embodiments, the system further includes a heat and solvent recovery subsystem, which is in fluid communication with the distillation tank and the solvent tank, and which is configured to condense solvent vapor from the distillation tank to a distillate solvent that can be reused within the system. An exemplary heat and solvent recovery subsystem includes: one or more heat exchangers and/or a condenser to condense solvent vapor received from the distillation tank to the distillate solvent; and a pump positioned downstream of the one or more heat exchangers and/or the condenser.

In some embodiments, the heat and solvent recovery subsystem includes one or more heat exchangers, the condenser, and the pump, with the condenser being positioned downstream of the one or more heat exchangers, and with the pump being positioned downstream of the condenser.

In some embodiments, the heat and solvent recovery subsystem includes a heat exchanger which is in fluid communication with the solvent tank, such that solvent from the solvent tank can be circulated through the heat exchanger and heated by solvent vapor within the heat exchanger. In one such embodiment, the heat and solvent recovery subsystem includes: a first heat exchanger in fluid communication with the water tank and the distillation tank; a second heat exchanger in fluid communication with the first heat exchanger and the solvent tank; and a condenser in fluid communication with the second heat exchanger.

In some embodiments, the system further includes a filter configured to filter out fine solids which may be present within the bitumen-infused solvent evacuated from the decanting tank. In such embodiments, the filter is positioned and in fluid communication with the decanting tank, such that the bitumen-infused solvent supplied to the distillation tank by the decanting tank passes through the filter prior to reaching the distillation tank.

In some embodiments, the system further includes a membrane configured to filter water evacuated from the water tank. In one such embodiment, the membrane is positioned and in fluid communication with the water tank, such that water evacuated from the water tank passes through the membrane prior to reaching the blender.

In some embodiments, the system further includes an inert gas source which is in fluid communication with the blender, the water tank, the decanting tank, and/or the distillation tank to provide an inert gas blanket and reduce oxidation of solvent present in the blender, the water tank, the decanting tank, and/or the distillation tank. In some embodiments, the inert gas source is configured to supply nitrogen gas.

In some embodiments, the solvent utilized in the system is at least one of limonene, n-Propyl Bromide (nPB), a fluorinated solvent, toluene, hexane, and 1,2-trans-dichloro-ethylene.

An exemplary method for separating bitumen from shingle powder in accordance with the present invention includes: a mixing step; a first decanting step; a washing step; a second decanting step; a separation step; a transfer step; and a vaporization step. During the mixing step, shingle powder containing bitumen and one or more non-bitumen constituents is mixed with a solvent in a blender to separate bitumen from the one or more non-bitumen constituents to produce a bitumen-infused solvent. During the first decanting step, bitumen-infused solvent is decanted from the blender into a first tank. During the washing step, the one or more non-bitumen constituents within the blender are washed with water to produce additional bitumen-infused solvent. During the second decanting step, the additional bitumen-infused solvent is decanted from the blender to the first tank. During the separation step, the bitumen-infused solvent received from the blender is separated from water present in the first tank. During the transfer step, the bitumen-infused solvent within the first tank is transferred to a second tank. During the vaporization step, the solvent from the bitumen-infused solvent received in the second tank is vaporized to isolate bitumen.

DETAILED DESCRIPTION OF THE INVENTION

The present invention is a system and a method for separating bitumen from shingle powder.

Figure 1A:
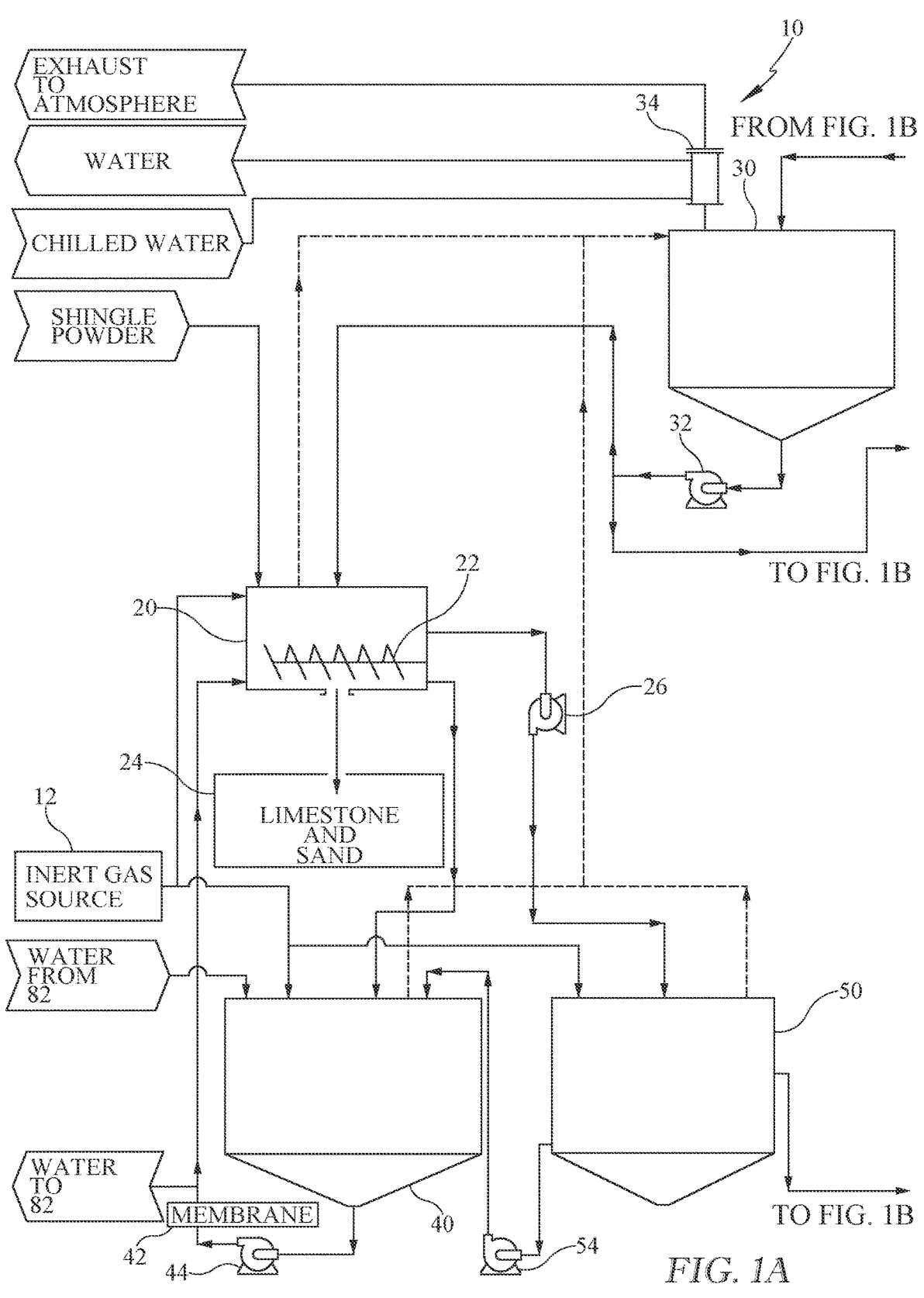
FIG. 1A is a schematic view of a first portion of an exemplary system for separating bitumen from shingle powder made in accordance with the present invention.
Figure 1B:
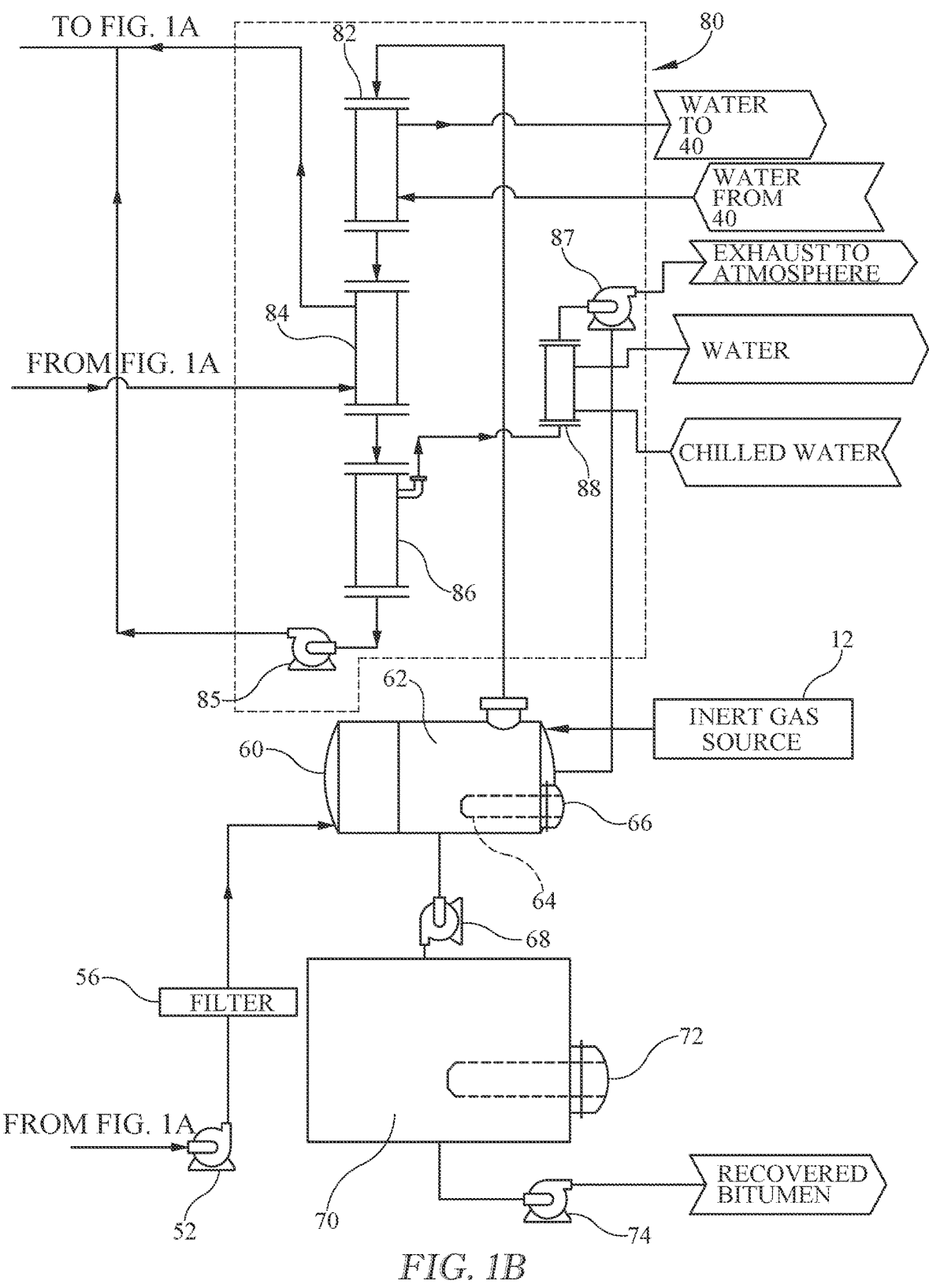
FIG. 1B is a schematic view of a second portion of the exemplary system for separating bitumen from shingle powder of FIG. 1A.

FIGS. 1A and 1B are schematic views of a first portion and a second portion, respectively, of an exemplary system for separating bitumen from shingle powder (or system) 10 made in accordance with the present invention.

As shown in FIGS. 1A and 1B, in this exemplary embodiment, the system 10 includes: a blender 20 in which shingle powder supplied to the system 10 is initially received; a solvent tank 30 which is in fluid communication with, and which supplies solvent for dissolving the shingle powder to, the blender 20; a water tank 40 which is in fluid communication with, and which supplies water to wash an interior of, the blender 20; a decanting tank 50 which is in fluid communication with, and which receives bitumen-infused solvent from, the blender 20; a distillation tank 60 which is in fluid communication with, and which isolates bitumen from bitumen-infused solvent received from, the decanting tank 50; and a plurality of pumps 26, 32, 44, 52, 54, 68, 74 for pumping fluids between the various components of the system 10 or out of the system 10.

In this exemplary embodiment, the system 10 further includes a collection tank 70 which is in fluid communication with the distillation tank 60, and which houses isolated bitumen received from the distillation tank 60 until the isolated bitumen is ready to be directed out of the system 10.

In this exemplary embodiment, the system 10 further includes a heat and solvent recovery subsystem 80, which treats the solvent separated from bitumen in the distillation tank 60 and circulates the treated solvent back to the solvent tank 30 for subsequent reuse within the system 10.

Figure 3:
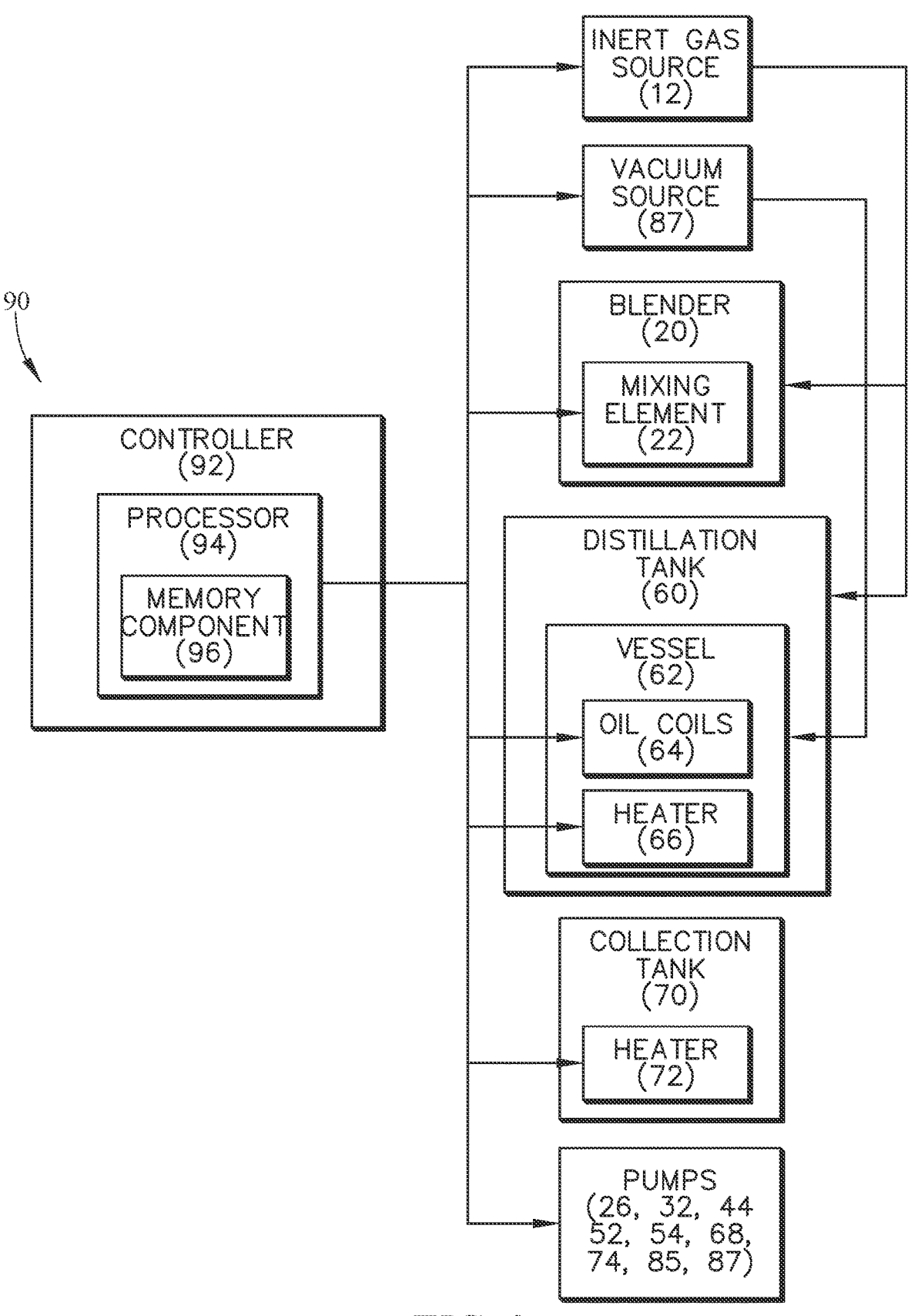
FIG. 3 is a schematic diagram of a control subsystem for use in the exemplary system of FIGS. 1A and 1B.

As shown in FIG. 3, in some embodiments, the system 10 may further include a control subsystem 90, which is operably connected to and configured to regulate certain operations of or associated with the blender 20, the distillation tank 60, the collection tank 70, the pumps 26, 32, 44, 52, 54, 68, 74, and the heat and solvent recovery subsystem 80.

It should be appreciated that the term "shingle powder," as used herein, is understood to mean particulates which are recovered from shingles (e.g., used shingles which have been torn off of a building prior to reroofing) and contains bitumen and one or more non-bitumen constituents, such as sand and/or limestone. Techniques for processing shingles into particulate form are known within the art and can be employed to produce shingle powder. For instance, in some implementations, the shingle powder received by the blender 20 may be produced utilizing the techniques disclosed in U.S. Pat. Nos. 8,919,681; 9,156,035; and/or 9,440,239, the entire disclosures of which are incorporated herein by reference. It should also be appreciated that shingle powder introduced into and treated by the system and method disclosed herein may be in a loose, uncompressed condition and/or in a compressed condition (e.g., in a briquette and/or pellet form), as disclosed, for example, in U.S. Pat. No. 11,591,524, the entire disclosure of which is incorporated herein by reference.

Referring now again to FIGS. 1A and 1B, in this exemplary embodiment, the blender 20 is a ribbon blender including a helical mixing element 22, which can be selectively activated to agitate materials deposited within the interior of the blender 20. It is appreciated, however, that blenders of alternative types or construction suitable for performing the operations of the blender 20 described herein may alternatively be utilized without departing from the spirit and scope of the present invention.

Referring still to FIGS. 1A and 1B, in this exemplary embodiment, the solvent tank 30, the water tank 40, and the decanting tank 50 are each a 2000-gallon stainless steel tank. Of course, tanks of alternative construction and/or volume capacity may, in alternative embodiments, be utilized for the solvent tank 30, the water tank 40, and/or the decanting tank 50 to better accommodate different system throughput requirements and/or solvent or shingle power compositions.

Referring still to FIGS. 1A and 1B, in this exemplary embodiment, the distillation tank 60 includes hot oil coils 64 and a heater 66 to treat bitumen-infused solvent received from the decanting tank 50 and bitumen isolated therefrom, as further described below. One suitable distillation system which may be utilized as the distillation tank 60 is the CRS two gallon per minute distillation system manufactured by CRS-SPV Inc. d/b/a CRS Reprocessing Services of Louisville, Kentucky.

Referring still to FIGS. 1A and 1B, in this exemplary embodiment, the collection tank 70 is a 10,000-gallon insulated carbon steel tank that includes a heater 72 for maintaining isolated bitumen received from the distillation tank 60 in a liquefied state, as further described below. Again, tanks of alternative construction and/or volume capacity may, in alternative embodiments, be utilized for the collection tank 70 to accommodate throughput of the system 10.

Referring still to FIGS. 1A and 1B, pumps suitable for performing the operations described herein for pumps 26, 32, 44, 52, 54, 68, 74, 85, and 87 are known in the art. In this exemplary embodiment: pumps 26, 32, 44, 52, 54, and 74 are each a 9923K45 circulation pump manufactured and distributed by McMaster-Carr of Elmhurst, Illinois; pumps 68 and 85 are each a ⅜" pump distributed by, e.g., R.A. Ross & Associates of Louisville, Kentucky; and pump 87 is an nES65 vacuum pump manufactured and distributed by Edwards Vacuum of Burgess Hill, United Kingdom. Of course, pumps of different types and/or models suitable for carrying out the respective operations of pumps 26, 32, 44, 52, 54, 68, 74, 85, and 87 may alternatively be utilized without departing from the spirit and scope of the present invention.

Further features and operations of the system 10 will become evident by the discussion of the exemplary method of the present invention which follows.

Figure 2:
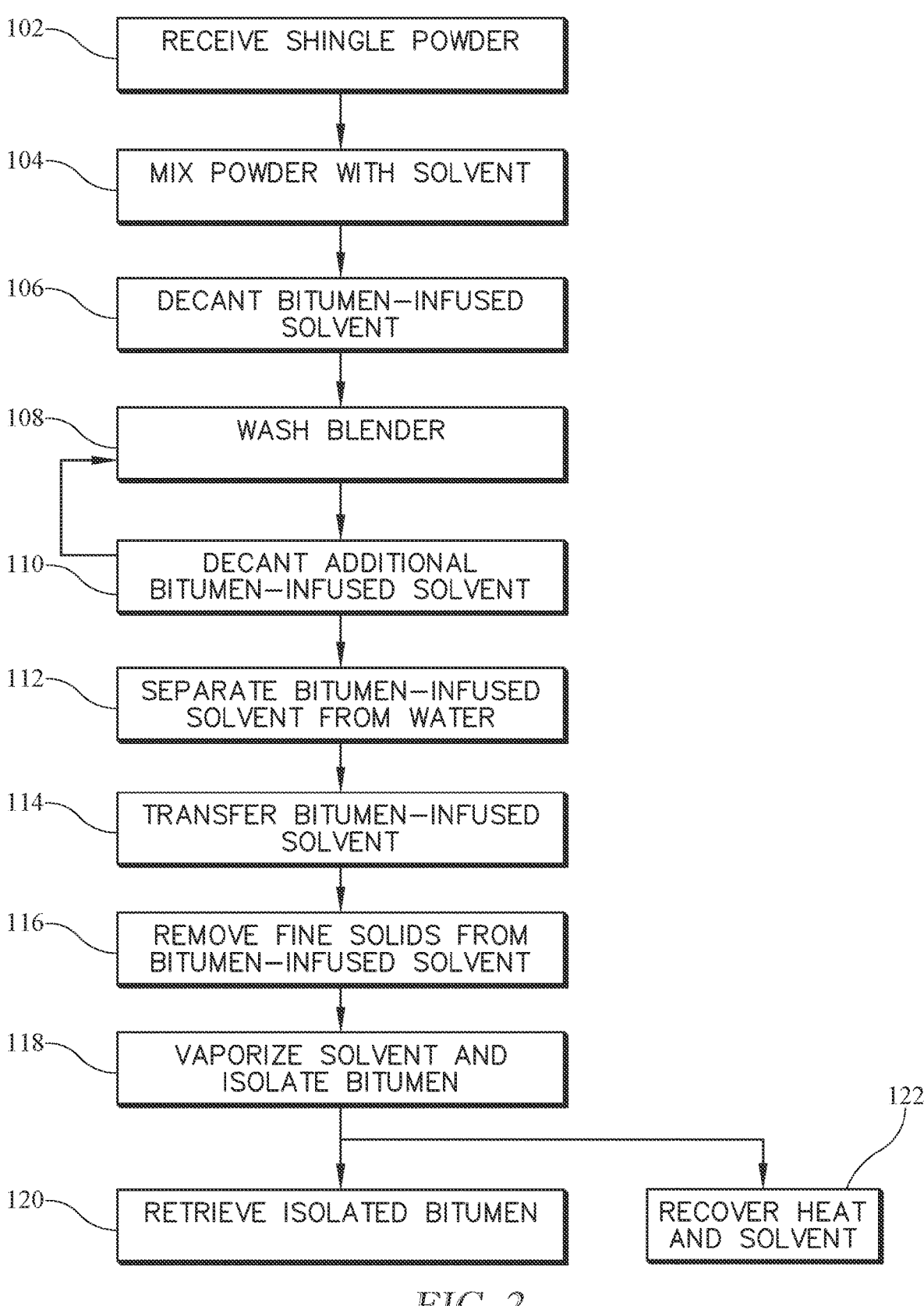
FIG. 2 is a flow diagram of an exemplary method for separating bitumen from shingle powder in accordance with the present invention.

FIG. 2 is a flow diagram of an exemplary method for separating bitumen from shingle powder in accordance with the present invention.

Referring now to FIGS. 1A and 2, the exemplary method commences in step 102 when shingle powder is received by the blender 20 (e.g., via a conveyor or auger positioned upstream of the blender 20). Once received in the blender 20, the shingle powder is then, in step 104, processed in a manner which promotes separation of the bitumen from the other non-bitumen constituents present in the shingle powder. In this exemplary implementation, the shingle powder received by the blender 20 includes bitumen, limestone, and sand, as evidenced by the presence of limestone and sand in a non-bitumen collection receptacle 24 in FIG. 1A and the output of bitumen in FIG. 1B. To facilitate separation of the bitumen within the shingle powder from the non-bitumen constituents, in step 104, solvent is pumped from the solvent tank 30 into the blender 20 via pump 32 to dissolve shingle powder deposited into the blender 20. In this exemplary embodiment and implementation, the solvent is pumped into the blender 20 prior to deposit of the shingle powder. Furthermore, in this exemplary embodiment and implementation, the solvent is an environmentally friendly solvent, such as limonene, which is first supplied to the blender 20 in a 1:1 (shingle powder:solvent) volume ratio at a temperature which is above ambient room temperature of the environment to promote dissolution of the shingle powder. As further discussed below, in this exemplary embodiment and implementation, the solvent supplied by the solvent tank 30 is heated by virtue of being circulated through certain components of the heat and solvent recovery subsystem 80 (FIG. 1B). In some embodiments, the heat of the solvent supplied to the blender 20 may additionally or alternatively be regulated by a heater (not shown) associated with, or forming part of, the solvent tank 30.

It should be appreciated that the solvent and the shingle powder-to-solvent volume ratio utilized is not necessarily limited to that referred to in connection with the exemplary embodiment and implementation above. Rather, the solvent and/or shingle powder-to-solvent volume ratio may vary to accommodate shingle powders and/or solvents of different compositions. For instance, in alternative embodiments and implementations, the solvent supplied to the blender 20 from the solvent tank 30 may be n-Propyl Bromide (nPB), fluorinated solvents, toluene, hexane, 1,2-trans-dichloroethylene, or combinations thereof, which are supplied to the blender 20 either alone or in combination with limonene. As shown in FIG. 1A, in this exemplary embodiment and implementation, excess heat from the solvent tank 30 is directed to a heat exchanger 34 through which chilled water is circulated in order to condense and prevent solvent gases from the solvent tank 30 from escaping into the atmosphere.

Referring now again to FIGS. 1A and 2 (and step 104 of the exemplary method), after receiving the solvent, the mixing element 22 of the blender 20 is activated for a predetermined period to mechanically agitate the shingle powder and release the bitumen contained therein into the solvent. The specific temperature and duration at which the shingle powder and solvent are mixed is based on the bitumen content of the shingle powder, and, as such, may vary to some extent depending on the shingle powder utilized. In this exemplary implementation, the shingle powder and solvent are mixed for approximately one hour at approximately 145° F., and the heat within the blender 20 is derived, at least in part, from the solvent, which, again, is heated by the solvent recovery subsystem 80 in the manner described below. Of course, it should be appreciated the duration of mixing and mixing temperature may vary depending on the shingle powder and/or solvent utilized. Embodiments and implementations in which the heat within the mixing area of the blender 20 is additionally or alternatively regulated by a heater associated with or forming part of the blender 20 are also contemplated herein.

The above-described mixing of the shingle powder containing bitumen and one or more non-bitumen constituents with a solvent to separate bitumen from the one or more non-bitumen constituents and produce a bitumen-infused solvent may be also be characterized as the "mixing step."

Referring still to FIGS. 1A and 2, following mixing of the shingle powder and solvent, the bitumen-infused solvent is separated from solid particulates from the shingle powder in step 106. To this end, during step 106, the blender 20 is deactivated for a predetermined period of time following mixing of the shingle powder and solvent. This stoppage of the blender 20 allows solid particulates from the shingle powder, including the non-bitumen constituents, to separate from the bitumen-infused solvent and settle at the bottom of the blender 20. Following separation of the solid particulates and bitumen-infused solvent, and referring still to step 106, the bitumen-infused solvent is decanted from the blender 20 into the decanting tank 50. In this exemplary embodiment and implementation, the bitumen-infused solvent is decanted from the blender 20 via pump 26. However, alternative embodiments in which the bitumen-infused solvent is decanted by way of being gravity fed from a nozzle (not shown) associated with or forming part of the blender 20 to the decanting tank 50 are also contemplated herein. In such embodiments, the blender 20 will typically be located upstream of, and in an elevated position relative to, the decanting tank 50.

The above-described separation of the bitumen-infused solvent from solid particulates in shingle powder in step 106 may also be characterized as a "first decanting step."

Referring still to FIGS. 1A and 2, in this exemplary implementation, following decanting of the bitumen-infused solvent into the decanting tank 50, clean hot water (i.e., water above ambient room temperature) is pumped from the water tank 40 and then pumped through a membrane 42 of the system 10 in fluid communication with the water tank 40 and into blender 20 via pump 44 in washing step 108. The membrane 42 is configured to remove any limestone solid debris within the water pumped from the water tank 40. One suitable membrane which may be utilized in this way is the Tough Ultra Filtration (TUF) membrane manufactured and distributed by CRS-SPV Inc. d/b/a CRS Reprocessing Services of Louisville, Kentucky. During step 108, as the water is directed into the blender 20, the mixing element 22 of the blender 20 is reactivated for a predetermined period (e.g., 30 minutes) to wash the remaining solid particulates and promote separation of additional bitumen-infused solvent therefrom. Following this predetermined mixing period, in step 110, the mixing element 22 of the blender 20 is slowed to a low revolution per minute (RPM) or completely stopped for a predetermined period to allow separation of the bitumen-infused solvent and solid particulates containing the non-bitumen constituents of the shingle powder. Following separation of the non-bitumen constituents and bitumen-infused solvent, and referring still to step 110, the additional bitumen-infused solvent and water is decanted from the blender 20 into the decanting tank 50 in the same manner as described above.

The separation of the additional bitumen-infused solvent from solid particulates in shingle powder in step 108 may also be characterized as a "second decanting step."

As evidenced above, in this exemplary embodiment and implementation, the bitumen-infused solvent and water is thus delivered to the decanting tank 50 in discrete batches. In this exemplary embodiment and implementation, the water supplied by the water tank 40 is heated by virtue of being circulated through certain components of the heat and solvent recovery subsystem 80 (FIG. 1B) prior to being directed to the blender 20. In some embodiments, the heat of the water supplied to the blender 20 may additionally or alternatively be regulated by a heater (not shown) associated with or forming part of the water tank 40.

Referring now to FIGS. 1A, 1B, and 2, in this exemplary embodiment and implementation, the system 10 further includes an inert gas source 12. The inert gas source 12 is in fluid communication with the blender 20, the water tank 40, the decanting tank 50, and the distillation tank 60, such that inert gas from the inert gas source 12 can be selectively injected into such components while solvent is present therein to provide an inert gas blanket and reduce oxidation of the solvent. The injection of inert gas can also help to ensure less solvent is retained in solid particulate and/or bitumen at different stages of the exemplary method, as further discussed below. In this exemplary embodiment, the inert gas source 12 is configured to supply nitrogen gas.

The processes described above with respect to the washing step 108 and the second decanting step 110 can be repeated multiple times to further wash solid particulates remaining in the blender 20 and separate bitumen-infused solvent therefrom. Accordingly, in some implementations, the method may include multiple washing and secondary decanting cycles, with each respective washing and secondary decanting cycle being defined by the completion of the processes described above with respect to steps 108 and 110 and providing multiple batches of bitumen-infused solvent to the decanting tank 50. In some implementations, the volume of solvent added to the blender 20 during the washing portion of each successive washing and secondary decanting cycle may be adjusted to better correspond to the volume of solid particulates remaining in the blender 20 after the washing and secondary decanting cycle. Following step 110, in this exemplary embodiment and implementation, excess water and the solid particulates containing the non-bitumen constituents of the shingle powder remaining after the final washing and secondary decanting cycle are evacuated from the blender 20 to the water tank 40 and the non-bitumen collection receptacle 24, respectively. In this regard, the blender 20 is thus also in fluid communication with the water tank 40, such that water within the blender 20 can be released into the water tank 40.

To filter out any contaminants within the water released from the blender 20 to the water tank 40, in some embodiments, an additional membrane (not shown) similar to membrane 42 may be provided between the blender 20 and the water tank 40, such that excess water released from the blender 20 must pass through such membrane prior to being received in the water tank 40. The solid particulates evacuated from the blender 20 may be subsequently dried and screened using known techniques to isolate the non-bitumen constituents of the shingle powder for subsequent use. Prior to the conclusion of the final washing and secondary decanting cycle, in this exemplary implementation, nitrogen gas is injected into the blender 20 by the inert gas source 12 to ensure that solvent is not retained in the solid particulate. The duration in which nitrogen gas is injected into the blender 20 will typically vary depending on the bitumen content of the shingle powder initially received by the blender 20. In this exemplary implementation and embodiment, nitrogen gas is injected into the blender 20 only at the time of the washing portion of the final washing and secondary decanting cycle.

Referring now again to FIGS. 1A, 1B, and 2, some degree of excess water may be present in the bitumen-infused solvent delivered to the decanting tank 50 in the first decanting step 106 and the second decanting step 110. In this regard, the bitumen-infused solvent comprising the bitumen from the shingle powder and the solvent may be delivered to the decanting tank 50 as part of a mixture which includes the bitumen-infused solvent and excess water. In step 112, such excess water is separated from the bitumen-infused solvent and removed. To this end, during step 112, the bitumen-infused solvent and any excess water associated therewith collected within the decanting tank 50 is allowed to sit for a predetermined period to permit separation of the bitumen-infused solvent and excess water. In this exemplary implementation, during step 112, nitrogen gas may also be injected into the decanting tank 50 by the inert gas source 12 to help prevent oxidation of the solvent of the mixture within the decanting tank 50. In this exemplary implementation and embodiment, nitrogen is continuously injected into the decanting tank 50. Referring still to FIGS. 1A, 1B, and 2, once the bitumen-infused solvent and excess water are fully separated, during step 114, the bitumen-infused solvent is transferred out of the decanting tank 50 to the distillation tank 60 via pump 52. Accordingly, as excess water must first be removed from the decanting tank 50 prior to evacuation of the bitumen-infused solvent, in this exemplary implementation, the bitumen-infused solvent is delivered to the distillation tank 60 in a discrete batch. In this exemplary embodiment and implementation, during step 114, the water separated from the bitumen-infused solvent within the decanting tank 50 is pumped from the decanting tank 50 to the water tank 40. Specifically, in this exemplary embodiment and implementation, the excess water contained in the decanting tank 50 and separated from the bitumen-infused solvent is recirculated back to the water tank 40 via pump 54 for reuse within the system 10. Accordingly, in this regard, the decanting tank 50 is also in fluid communication with the water tank 40.

Referring still to FIGS. 1A, 1B, and 2, to address and remove fine solids which may persist within, or otherwise remain associated with, the bitumen-infused solvent, during step 116, the bitumen-infused solvent is passed through a filter 56 to remove such fine solids. Accordingly, in this exemplary embodiment, the system 10 further includes the filter 56, which is in fluid communication with the decanting tank 50, such that bitumen-infused solvent supplied to the distillation tank 60 by the decanting tank 50 passes through the filter 56 prior to reaching the distillation tank 60. In this exemplary embodiment, the filter 56 is configure to filter out solids which are 0.5 microns or larger in size. Accordingly, one suitable filter which may be utilized as the filter 56 is the F3AVFB00102 filter manufactured by Eaton Corporation of Dublin, Ireland.

Referring now to FIGS. 1B and 2, after the bitumen-infused solvent is received in the distillation tank 60, in step 118, bitumen is isolated from the bitumen-infused solvent by removing the solvent. To this end, in this exemplary embodiment and implementation, the bitumen-infused solvent is directed into a vacuum distillation vessel 62 of the distillation tank 60 where a vacuum is created and the solvent of the bitumen-infused solvent is heated utilizing hot oil coils 64 until the solvent is vaporized and vented out of the distillation tank 60, thus leaving isolated bitumen behind in the vacuum distillation vessel 62. In this regard, step 118 may also be characterized as a "vaporization step." The isolated bitumen is then heated further within the vacuum distillation vessel 62, via a heater 66 of the distillation tank 60, to its melting point. Once the isolated bitumen is liquefied, the vacuum within the vacuum distillation vessel 62 is relieved, and, in this exemplary implementation, nitrogen gas is injected into the distillation tank 60 to help ensure the release of all solvent from the bitumen. The isolated, liquefied bitumen is then evacuated into the collection tank 70 in step 112 via pump 68 in step 120. The duration in which pump 68 is activated to evacuate the isolated, liquefied bitumen into the collection tank 70 will, of course, be a function of the volume of isolated, liquefied bitumen within the distillation tank 60.

Alternative embodiments and implementations in which the system 10 further includes a valve (not shown) that is provided between the distillation tank 60 and the collection tank 70 and which is used to regulate the purging of the isolated bitumen into the collection tank 70 are also contemplated herein. As shown in FIG. 1B, in this exemplary embodiment, the collection tank 70 includes a heater 72 to maintain the liquefied, isolated bitumen in a liquefied state prior to being evacuated from the system 10. In this exemplary embodiment and implementation, pump 74, which is positioned downstream of the collection tank 70, is used to evacuate the liquefied, isolated bitumen from the collection tank 70 out of the system 10 to an intended destination.

Referring now specifically to FIG. 1A, as evidenced by the dashed arrows, in this exemplary embodiment, the blender 20, the water tank 40, and the decanting tank 50 are each vented through exhaust lines to the solvent tank 30, which, in turn, is in fluid communication with a heat exchanger 34 to prevent gaseous solvent from escaping into the atmosphere. As shown, the solvent tank 30 is in fluid communication with a heat exchanger 34 through which chilled water (or another fluid) is circulated, such that gaseous solvent within the solvent tank 30 is exhausted to the heat exchanger 34 for cooling. The condensed portion of the exhaust is returned to the solvent tank 30 for subsequent reuse within the system 10 while non-condensable gases are exhausted to the atmosphere.

Referring now again to FIGS. 1A, 1B, and 2, in this exemplary embodiment and implementation, subsequent to the solvent of the bitumen-infused solvent being vaporized in the distillation tank 60 in step 118, the thermal energy and solvent vapor are recovered for reuse within the system 10 in step 122. In this regard, in this exemplary embodiment, the system 10 thus further includes a heat and solvent recovery subsystem 80, through which solvent vapor from the distillation tank 60 is passed and treated during step 114, and which is configured to: (i) make use of thermal energy from the solvent vaporized and vented from the distillation tank 60 to heat various fluids within the system 10; and (ii) condense solvent vapor from the distillation tank 60 to a distillate solvent and return the distillate solvent back to the solvent tank 30 for reuse within the system 10. To this end, the heat and solvent recovery subsystem 80 includes one or more devices for cooling the solvent vapor from the distillation tank 60 and one or more pumps to direct the solvent vapor or distillate solvent.

Referring now specifically to FIGS. 1A and 1B, in this exemplary embodiment, the heat and solvent recovery subsystem 80 includes: a first heat exchanger 82, which acts as a first heat recovery means for solvent vapor vented from the distillation tank 60; a second heat exchanger 84, which acts as a secondary heat recovery means for solvent vapor vented from the distillation tank 60; a condenser 86, which condenses cooled solvent vapor from the second heat exchanger 84 to distillate solvent; and a pump 85, which pumps the distillate solvent to the solvent tank 30 for reuse within the system 10. The first heat exchanger 82 is in fluid communication with the distillation tank 60, such that the solvent vapor released from the distillation tank 60 is directed into the first heat exchanger 82. As shown, the first heat exchanger 82 is also in fluid communication with the water tank 40, such that water from the water tank 40 is circulated through the first heat exchanger 82. As the water from the water tank 40 circulating through the first heat exchanger 82 is cooler than the solvent vapor passing through the first heat exchanger 82, the circulating water is heated and the solvent vapor is cooled. In this way, the first heat exchanger 82 thus recovers and applies the thermal energy from the solvent vapor exiting the distillation tank 60 to water which can subsequently be supplied to the blender 20. The second heat exchanger 84 is positioned downstream of, and in fluid communication with, the first heat exchanger 82, such that the solvent vapor cooled by the first heat exchanger 82 is directed into the second heat exchanger 84 for further cooling. As shown, the second heat exchanger 84 is in fluid communication with the solvent tank 30, such that solvent from the solvent tank 30 is circulated through the second heat exchanger 84 by pump 32. As the solvent from the solvent tank 30 circulating through the second heat exchanger 84 is cooler than the solvent vapor passing through the second heat exchanger 84, the circulating solvent is heated and the solvent vapor is further cooled. In this way, the second heat exchanger 84 thus recovers and applies the thermal energy from the solvent vapor exiting the first heat exchanger 82 to solvent which can subsequently be supplied to the blender 20. The condenser 86, is positioned downstream of, and in fluid communication with, the second heat exchanger 84, such that the solvent vapor cooled by the second heat exchanger 84 is directed into the condenser 86, which has coolant circulating therethrough or is otherwise chilled. As the solvent vapor passes through the condenser it is condensed into a liquid state to produce a distillate solvent which is pumped from the condenser 86 to the solvent tank 30 via pump 85. The pump 85 is thus positioned downstream of the condenser 86, and is in fluid communication with both the condenser 86 and the solvent tank 30.

Referring now specifically to FIG. 1B, in this exemplary embodiment, the heat and solvent recovery subsystem 80 further includes a third heat exchanger 88; and an additional pump 87 that is in fluid communication with the third heat exchanger 88. The third heat exchanger 88 is in fluid communication with the condenser 86, such that any non-condensed solvent vapor is directed to the third heat exchanger 88. As shown, chilled water is circulated through the third heat exchanger 88 to cool the received solvent vapor and reduce the risk of solvent entering the atmosphere. Solvent cooled and condensed by the third heat exchanger 88 flows back through the piping interconnecting the condenser 86 and the third heat exchanger 88 to pump 85, which pumps such solvent to the solvent tank 30. Non-condensable gases are exhausted to the atmosphere via pump 87.

In this exemplary embodiment, the first heat exchanger 82, the second heat exchanger 84, the third heat exchanger 88, and the condenser 86 are each a 34965K heat exchanger manufactured and distributed by McMaster-Carr of Elmhurst, Illinois. Accordingly, in this exemplary embodiment, the condenser 86 is actually comprised of a fourth heat exchanger. Of course, the first heat exchanger 82, the second heat exchanger 84, the condenser 86, and the third heat exchanger 88 are not necessarily limited to such construction. Rather, one of skill in the art will readily appreciate that alternative heat exchangers and/or condensers suitable for carrying out the operations of the first heat exchanger 82, the second heat exchanger 84, the third heat exchanger 88, and/or the condenser 86 described herein may alternatively be utilized without departing from the spirit and scope of the present invention.

Referring now to FIG. 3, the exemplary system 10 further includes a control subsystem 90, which is configured to control and automate certain operations of the system 10 and effectuate certain aspects of the steps described above with reference to FIGS. 1A, 1B, and 2. Accordingly, in this exemplary embodiment and implementation, certain aspects of the method steps described above with reference to FIG. 2 are automated. Accordingly, as shown in FIG. 3, the control subsystem 90 includes a controller 92, which includes a processor 94 for executing instructions (routines) stored in a memory component 96 or other computer-readable medium to carry out the operations of the controller described herein.

In this exemplary embodiment, the controller 92 is operably connected to each respective pump 26, 32, 44, 52, 54, 68, 74, 85, 87 of the system 10, such that the controller 92 can selectively communicate instructions (signals) to each respective pump 26, 32, 44, 52, 54, 68, 74, 85, 87 which cause the respective pump 26, 32, 44, 52, 54, 68, 74, 85, 87 to activate, deactivate, increase in pump flow rate, and/or decrease in pump flow rate.

In this exemplary embodiment, the controller 92 is also operably connected to the mixing element 22 of the blender 20, such that the controller can selectively communicate instructions which cause the mixing element 22 to activate, deactivate, increase revolution rate, and/or decrease revolution rate.

In this exemplary embodiment, the controller 92 is also operably connected to the hot oil coils 64 of the distillation tank 60, such that the controller 92 can selectively communicate instructions which cause the hot oil coils 64 of the distillation tank 60 to activate, deactivate, increase in temperature, and/or decrease in temperature.

In this exemplary embodiment, the controller 92 is also operably connected to the heater 66 of the distillation tank 60, such that the controller 92 can selectively communicate instructions which cause the heater 66 of the distillation tank 60 to activate, deactivate, increase in temperature, and/or decrease in temperature.

In this exemplary embodiment, the controller 92 is also operably connected to a vacuum source which itself is operably connected to the vacuum distillation vessel 62 of the distillation tank 60, such that the controller 92 can selectively communicate instructions which cause the vacuum source to activate, deactivate, increase vacuum pressure in the vacuum distillation vessel 62, and/or decrease vacuum pressure in the vacuum distillation vessel 62. In this exemplary embodiment and implementation, the vacuum source for the distillation tank 60 is pump 87 of the heat and solvent recovery subsystem 80, which, as noted above, is a vacuum pump. However, alternative embodiments in which the vacuum source for the distillation tank 60 is an independent vacuum source which is separate from the other components of the system 10 described herein are also contemplated.

In this exemplary embodiment, the controller 92 is also operably connected to the heater 72 of the collection tank 70, such that the controller 92 can selectively communicate instructions which cause the heater 72 of the collection tank 70 to activate, deactivate, increase in temperature, and/or decrease in temperature.

Referring still to FIG. 3, in some embodiments and implementations, the controller 92 may communicate instructions to some or all of the various components of the system 10 with which the controller 92 is operably connected based on readings or signals obtained from sensors (not shown) present throughout the system (e.g., implemented in the blender 20, the solvent tank 30, the water tank 40, the decanting tank 50, the distillation tank 60, the collection tank 70, and/or one or more components of the heat and solvent recovery subsystem 80). Additionally or alternatively, the controller 92 may communicate instructions to some or all of the various components of the system 10 with which the controller 92 is operably connected in accordance with pre-programmed time intervals. While the controller 92 is primarily described herein in singular form, it is appreciated that, in some embodiments and implementations, the controller 92 may actually comprise multiple controllers, with each respective controller including a processor and memory component and being operably connected to one or more components of the system 10.

Although reference is sometimes made herein to certain materials within the system 10 being transferred from one component of the system 10 to another component of the system 10 in discrete batches, it should be appreciated that alternative embodiments in which such materials are transferred as a continuous flow between such components are also contemplated herein. It should be appreciated that each operation performed by the exemplary system 100 described herein can also be characterized as an aspect of the individual method steps identified and described above or, depending on the context in which such operation is referred, as an independent method step, which, in some implementations, may comprise an additional method step of the method described above, unless otherwise specified. Furthermore, it should be appreciated that while the respective steps of the exemplary method are described above in a sequential order that multiple steps of the method may occur simultaneously and/or in an alternative order from that expressly described above, except where context precludes otherwise.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for separating bitumen from shingle powder, comprising:

a blender configured to receive and mix a solvent and shingle powder containing bitumen and one or more non-bitumen constituents to separate the bitumen from the one or more non-bitumen constituents and produce a bitumen-infused solvent;

a plurality of tanks, including a solvent tank in fluid communication with the blender, the solvent tank supplying the solvent to the blender, a water tank in fluid communication with the blender, the water tank supplying water to wash an interior of the blender in which the solvent and the shingle powder is mixed, a decanting tank in fluid communication with the blender, the decanting tank configured to receive the bitumen-infused solvent from the blender and to separate the bitumen-infused solvent from the water, and a distillation tank in fluid communication with the decanting tank, wherein the distillation tank is configured to vaporize the solvent of the bitumen-infused solvent to isolate bitumen from the bitumen-infused solvent received from the decanting tank, resulting in an isolated bitumen in the distillation tank; and a plurality of pumps, with each pump of the plurality of pumps configured to either (i) pump fluid from one tank of the plurality of tanks to one of the blender and another tank of the plurality of tanks or (ii) pump fluid from the blender to one of the plurality of tanks.

2. The system according to claim 1, and further comprising a filter in fluid communication with the decanting tank, such that the bitumen-infused solvent passes through the filter prior to reaching the distillation tank.

3. The system according to claim 1, and further comprising a membrane in fluid communication with the water tank, such that the water supplied to the blender by the water tank passes through the membrane prior to reaching the blender.

4. The system according to claim 1, and further comprising an inert gas source in fluid communication with at least one of the blender, the water tank, the decanting tank, and the distillation tank.

5. The system according to claim 4, wherein the inert gas source is configured to supply nitrogen gas to the at least one of the blender, the water tank, the decanting tank, and the distillation tank.

6. The system according to claim 4, wherein the inert gas source is in fluid communication with the blender, the decanting tank, and the distillation tank.

7. The system according to claim 1, wherein the distillation tank includes a vacuum distillation vessel in which the solvent of the bitumen-infused solvent is evaporated and the isolated bitumen is liquefied.

8. The system according to claim 1, and further comprising a heat and solvent recovery subsystem in fluid communication with the distillation tank and the solvent tank and configured to condense solvent vapor from the distillation tank to a distillate solvent, the heat and solvent recovery subsystem including:

at least one of (a) one or more heat exchangers and (b) a condenser to condense solvent vapor received from the distillation tank to the distillate solvent; and a pump positioned downstream of the at least one of the (a) one or more heat exchangers and (b) the condenser and configured to pump the distillate solvent to the solvent tank.

9. The system according to claim 8, wherein the heat and solvent recovery subsystem includes the one or more heat exchangers, with the one or more heat exchangers including a heat exchanger that is in fluid communication with the solvent tank, and is configured to receive the solvent vapor from one of the distillation tank and another heat exchanger of the solvent recovery subsystem; and wherein solvent from the solvent tank is circulated through the heat exchanger in fluid communication with the solvent tank and heated by solvent vapor within the heat exchanger in fluid communication with the solvent tank when the system is in use.

10. The system according to claim 1, and further comprising a heat and solvent recovery subsystem, which includes:

one or more heat exchangers;

a condenser; and a pump;

wherein the condenser is positioned downstream of the one or more heat exchangers, and the pump is positioned downstream of the condenser.

11. The system according to claim 1, and further comprising a collection tank in fluid communication with the distillation tank and configured to receive the isolated bitumen from the distillation tank.

12. The system according to claim 11, wherein the collection tank includes a heater for maintaining the isolated bitumen received from the distillation tank in a liquefied state.

13. The system according to claim 1, wherein the solvent is limonene, n-Propyl Bromide (nPB), a fluorinated solvent, toluene, hexane, 1,2-trans-dichloroethylene, or a combination thereof.

14. A system for separating bitumen from shingle powder, comprising:

a blender configured to receive and mix a solvent and shingle powder containing bitumen;

a plurality of tanks, including a solvent tank in fluid communication with the blender, the solvent tank supplying the solvent to the blender, a water tank in fluid communication with the blender, the water tank supplying water to wash an interior of the blender in which the solvent and the shingle powder is mixed, a decanting tank in fluid communication with the blender, the decanting tank configured to receive bitumen-infused solvent from the blender, and a distillation tank in fluid communication with the decanting tank, wherein the distillation tank is configured to vaporize the solvent of the bitumen-infused solvent to isolate bitumen from the bitumen-infused solvent received from the decanting tank, resulting in an isolated bitumen in the distillation tank;

a plurality of pumps, with each pump of the plurality of pumps configured to either (i) pump fluid from one tank of the plurality of tanks to one of the blender and another tank of the plurality of tanks or (ii) pump fluid from the blender to one of the plurality of tanks; and a heat and solvent recovery subsystem, which includes:

a first heat exchanger in fluid communication with the water tank and the distillation tank, such that solvent vapor from the distillation tank is passed through the first heat exchanger while water from the water tank is simultaneously circulated through the first heat exchanger when the system is in use, a second heat exchanger in fluid communication with the first heat exchanger and the solvent tank, such that solvent vapor from the first heat exchanger can be passed through the second heat exchanger while the solvent from the solvent tank is simultaneously circulated through the second heat exchanger, and a condenser, wherein the condenser is in fluid communication with the second heat exchanger and is configured to form a distillate solvent.

15. A method for separating bitumen from shingle powder, comprising steps of:

mixing, in a blender, shingle powder containing bitumen and one or more non-bitumen constituents with a solvent to separate bitumen from the one or more non-bitumen constituents and produce a bitumen-infused solvent;

decanting the bitumen-infused solvent from the blender into a first tank;

washing, within the blender, the one or more non-bitumen constituents with water to produce additional bitumen-infused solvent;

decanting the additional bitumen-infused solvent from the blender into the first tank;

separating, within the first tank, the bitumen-infused solvent and the additional bitumen-infused solvent from water present in the first tank;

transferring, subsequent to separation of the bitumen-infused solvent and the additional bitumen-infused solvent from water within the first tank, the bitumen-infused solvent and the additional bitumen-infused solvent within the first tank into a second tank; and vaporizing, in the second tank, the solvent from the bitumen-infused solvent and the additional bitumen-infused solvent, resulting in an isolated bitumen in the second tank.

16. The method according to claim 15, and further comprising a step of filtering the bitumen-infused solvent and the additional bitumen-infused solvent.

17. The method according to claim 15, and further comprising a step of injecting an inert gas into at least one of the blender, the first tank, and the second tank.

18. The method according to claim 17, wherein the inert gas is injected into the blender, the first tank, and the second tank.

19. The method according to claim 15, and further comprising a step of liquefying, in the second tank, the isolated bitumen.

20. The method according to claim 19, and further comprising steps of:

transferring the liquefied isolated bitumen from the second tank into a third tank; and heating, in the third tank, the liquefied isolated bitumen.

21. The method according to claim 15, and further comprising steps of:

condensing solvent vapor from the second tank to form a distillate solvent; and transferring the distillate solvent to a solvent supply source in fluid communication with the blender.

22. The method according to claim 15, and further comprising a step of:

passing solvent vapor from the second tank through a heat exchanger in fluid communication with a solvent supply source as solvent from the solvent supply source is simultaneously circulated through the heat exchanger.

23. The method according to claim 15, wherein, in the step of transferring the bitumen-infused solvent and the additional bitumen-infused within the first tank into the second tank, the bitumen-infused solvent and the additional bitumen-infused solvent is transferred in discrete batches.

24. The method according to claim 15, wherein the solvent is limonene, n-Propyl Bromide (nPB), a fluorinated solvent, toluene, hexane, and 1,2-trans-dichloroethylene, or a combination thereof.

\* \* \* \* \*